United States Patent [19]
Kobayashi et al.

[11] 3,873,425
[45] Mar. 25, 1975

[54] PROCESS FOR PRODUCING ITACONIC ACID

[76] Inventors: Tatsuyoshi Kobayashi, 5-7-38, Sobudai-danchi 1-Chome, Sagamihara; Isei Nakamura, 14-9, Arai 2-Chome, Nakano-ku; Mitsutoshi Nakagawa, 1-3-4, Kamisoshigaya 4-Chome, Setagaya-ku, both of Tokyo, all of Japan

[22] Filed: Nov. 14, 1972

[21] Appl. No.: 306,203

[30] Foreign Application Priority Data
Nov. 19, 1971  Japan................................ 46-92345
Mar. 18, 1972  Japan................................ 47-27650

[52] U.S. Cl. ............. 195/36 R, 195/81, 204/180 P, 195/115
[51] Int. Cl............................................... C12d 1/02
[58] Field of Search ............. 195/81, 115, 104, 105, 195/108, 106, 35, 36, 117, 139; 260/537 N; 204/180 R, 180 PB

[56] References Cited
UNITED STATES PATENTS
3,162,582  12/1964  Batti ..................................... 195/36
3,544,455  12/1970  Adams et al.......................... 210/23
3,711,392  1/1973  Metzger............................ 204/180 R
3,720,583  3/1973  Fisher................................. 195/115
3,752,749  8/1973  Chlanda et al. ................. 204/180 P OTHER PUBLICATIONS
Chem. Abstracts, 74, 86353e.

Primary Examiner—Alvin E. Tanenholtz
Assistant Examiner—Thomas J. Wiseman
Attorney, Agent, or Firm—McGlew and Tuttle

[57] ABSTRACT

Itaconic acid fermentation broth prepared in routine manner is subjected to pre-treatment to remove high molecular impurities, which have a property to prevent electrodialysis, and after treating with cation-exchange resin and further neutralizing, the above filtrate of the fermented broth is electrodialyzed through ion-exchange membranes, so as to obtain refined solution of itaconate, and the dialyzate recovered in the electrodialysis is effectively recycled to form the raw material of the next fresh fermentation medium, whereby an almost closed process system for production of itaconic acid may be attained. The objects and advantages of the present process reside in, that yield of itaconic acid is higher in the sum total; that fermentation period in batchwise fermentation is reduced; and that the quantities of waste liquor discharged therefrom are effectively decreased (this point is very important from viewpoint of prevention of public hazards).

11 Claims, 4 Drawing Figures

PROCESS FOR PRODUCING ITACONIC ACID

BACKGROUND OF THE INVENTION

1. Field of the Invention

The present invention relates to a process for production of itaconic acid. More particularly the invention relates to a process for production of itaconic acid, which comprises electrodialyzing itaconic acid salt generated from the fermented broth through ion-exchange membranes and recycling dialyzate recovered in the electrodialysis to form the raw material of the next fermentation medium, whereby constructing an almost closed process system for production of itaconic acid.

The concentration of itaconic acid accumulated the in cultured broth of the itaconic acid fermentation generally amounts to 6–7 % at most ( 50–60 % in yield to the consumed sugar), while a considerable amount of sugar having not been consumed remains in the broth. Therefore, when said broth is concentrated in order to crystallize out itaconic acid therefrom through a conventional evaporation-crystallization process, the above-mentioned remaining sugar is simultaneously concentrated, thereby crystallization and isolation of itaconic acid from such concentrated liquor are prevented. In the case of employing cheap molasses containing much impurities, such as cane blackstrap molasses, high test molasses, beet molasses and the like, as sugar material, the yield of itaconic acid accmulated in the cultured broth decreases and the amount of remaining sugar becomes larger.

2. Prior Art

The the so-called continuous and stationary fermentation with aeration and agitation, fresh culture medium is continuously fed into the fermentor at a predetermined rate, while the same volume of culturing broth is continuously discharged from the fermentor, whereby the concentration of itaconic acid and that of mycelium in the culturing broth are maintained on stationary levels (of. C.A. 67, 115743v(1967); Process Biochem., 2(No.9), 61 (1967) ). Thus, it is generally known that the lower the concentration of itaconic acid in the culturing broth as such stationary level, the more the accumulating rate of itaconic acid in the culturing broth per day ( g./dl of broth/day ) increase ( cf. FIG. 3 ). Consequently, in such a continuous fermentation wherein a lower stationary level of itaconic acid concentration is employed and therefore a higher concentration of remaining sugar is necessarily caused, the prevention of crysallization of itaconic acid due to the remaining sugar in the evaporation-crystallization step is more intensified.

On the other hand, in fermentation industries, e.g., alcoholic fermentation-, organic acid fermentation-, amino acid fermentation-industries and the like, as regards so-called fermented broth wastes, which are unavoidably formed in the extracting step of the object substances contained in the fermented broth, it is legally regulated in general, from the viewpoint of prevention of public hazards, that such wastes should be treated with activated sludge and the like, before discarging them into river and the like, so as to decrease the quantities of so-called Biological Oxygen Demand-increasing substances contained in the wastes below prescribed levels.

In the itaconic acid fermentation industry, in the event that itaconic acid crystals are isolated from fermented broth through a customary evaporation-crystallization process, large quantity of sugar and a considerable amount of uncrystallized itaconic acid remains in the fermented broth waste, so that such a pretreatment of the waste as described above become one of the unavoidable and troublesome subjects.

We have previously proposed a process for refinement of itaconic acid contained in the fermentation broth, wherein the broth is treated with anion-exchange resin of basic form to cause itaconic acid to be absorbed on the resin and followed by elution of the acid from the resin with alkaline aqueous solution to give a refined solution of itaconate ( cf. J. Ferment. Technol., Japan, 46, 158(1968) ), and another process for refinement of itaconic acid contained in the fermentation broth, wherein lead carbonate is added to the broth to precipitate the lead itaconate and followed by decomposing the lead itaconate with alkaline aqueous solution ( cf. U.S. Pat. No. 3,621,053, British Pat. No. 1,217,242, Japanese Pat. No. 612,209 ).

However, these two processes have such shortcomings that the resin materials are expensive and the operations are complicated and further the problem from the viewpoint of prevention of public hazards remains as unsolved, especially in the lead carbonate-process.

SUMMARY OF THE INVENTION

The present invention has solved difficulties of the conventional itaconic acid production as mentioned above.

That is, the invention is a process for the production of itaconic acid, which comprises steps of, carrying out an itaconic acid fermentation in a routine manner, removing high molecular substances from said broth, which high molecular substances, are slightly contained in the fermented broth and have a property to prevent electrodialysis of itaconic acid salt generated, from said broth, contacting thus obtained filtrate with cation-exchange resin of alkali metal salt form produced through the later step of the present process, so as to regenerate the resin to acid form, neutralizing the cation-exchanged liquor, feeding said liquor into the diluting compartment of electrodialyzer consisting of ion-exchange membranes, while an aqueous solution of alkali metal salts of strong acid and/or alkali metal salt of itaconic acid being fed into the concentrating compartment of the same, so as to electrodialyze the itaconic acid salt contained in the liquor, incorporating the concentrate recovered from the concentrating compartment with refined liquor of the retentate produced through the removing operation of the high molecular substances contained in the filtrate of fermented broth, crystallizing and isolating itaconic acid or alkali metal salt thereof from the above incorporated liquor, and contacting the dialyzate recovered from the diluting compartment with about an equivalent quantity of cation-exchange resin of acid form regenerated in the above step, and recycling the resulting cation-exchanged liquor to form the raw material of the next fresh fermentation medium.

The electrodialysis through ion-exchange membranes have recently been employed effectively in preparing concentrated solution of sodium chloride from sea water. However, such an electrodialysis has never been adopted in preparing concentrated liquor of object substances from fermented broth, for the reason that the meshes of dialytic membranes are stopped up in the course of the dialyzing period and therefore long time continuous operation thereof becomes impossible.

According to the present invention, the electrodialysis of itaconic acid salt generated from the fermented broth through ion-exchange membranes is made possible, by means of removing high molecular impurities which are contained in the broth and considered to prevent the electrodyalysis, through, e.g., ultrafiltration or isolation by reverse osmosis, and moreover, the dializate which is recovered in the electrodialysis and contains a considerable amount of itaconic acid, sugar and the like, is, after being cation-exchanged, effectively recycled to form the materials of the next fresh fermentation medium.

It has no practicability in general to recycle and to reutilize mother liquor or intermediate waste liquor, which has the isolating-and collecting-steps of the desired substances contained in the fermented broth, as the material of next fresh fermentation medium. The reason of such impracticability is considered to be that the remaining sugar and/or other organic substances generally contained in the fermented broth are decomposed through heating operation and/or some other severely conditioned operations in connection with the broth and such decomposed products prevent the growth of the microorganisms in the next fermentation step.

However, it is, in the present invention, considered as follows: the fermented broth is subjected to passing through several kinds of mild operations such as ultrafiltration or isolation by reverse osmosis, treatment with ion-exchange resin and further electrodialysis, so that such decomposed products as the above-mentioned are not formed throughout all the operations, but some unavailable substances in the broth are removed, whereby the reutilization of the broth waste (dialyzate recovered from the electrodialysis step) becomes possible.

On the other hand, the concentrate recovered from the concentrating compartment of the electrodialyzer in the process, contains only alkali metal salt of itaconic acid or only the same salt together with alkali metal salts of strong acid, and does not contain other organic substances and the like, which are generally seen in the fermented broth, so that free itaconic acid or itaconate can readily be crystallized and isolated from such liquor.

OBJECTS OF THE INVENTION

Accordingly, an object of the invention is to provide a process for production of itaconic acid where crystals of itaconic acid can be isolated in a higher yield in total for the sugar material, particularly in the case of using impure molasses and the like.

Another object of the invention is to provide an effective process for production of itaconic acid from the viewpoint of preventing of public hazards, wherein amounts of fermented waste liquor containing BOD-increasing substances are markedly decreased.

Still another object of the invention is to provide a process for production of itaconic acid, wherein the fermentation period in backwise is reduced by ending the fermentation at a state wherein the concentration of remaining sugar in the cultured broth thereof is still higher.

Still further objects of the invention will thereafter be understood from the explanation with respect to the embodiments of the invention in reference to the accompanying drawings.

BRIEF DESCRIPTION OF THE DRAWINGS

In the drawings:

FIG. 1 is a so-called Sankey diagram of an embodiment in case of adopting batchwise itaconic acid fermentation in the present invention. A Sankey diagram represents a flowsheet, wherein the mass balance is expressed by breadth and more particularly "The New Rheinau Wood Saccharification Process" reported by K. Schoenemann in the "Paper Presented To The Congress Of The Food And Agriculture Organization Of The United Nations, at Stockholm, July 27, 1953," may be referred to.

DESCRIPTION OF THE INVENTION

Figure 1:
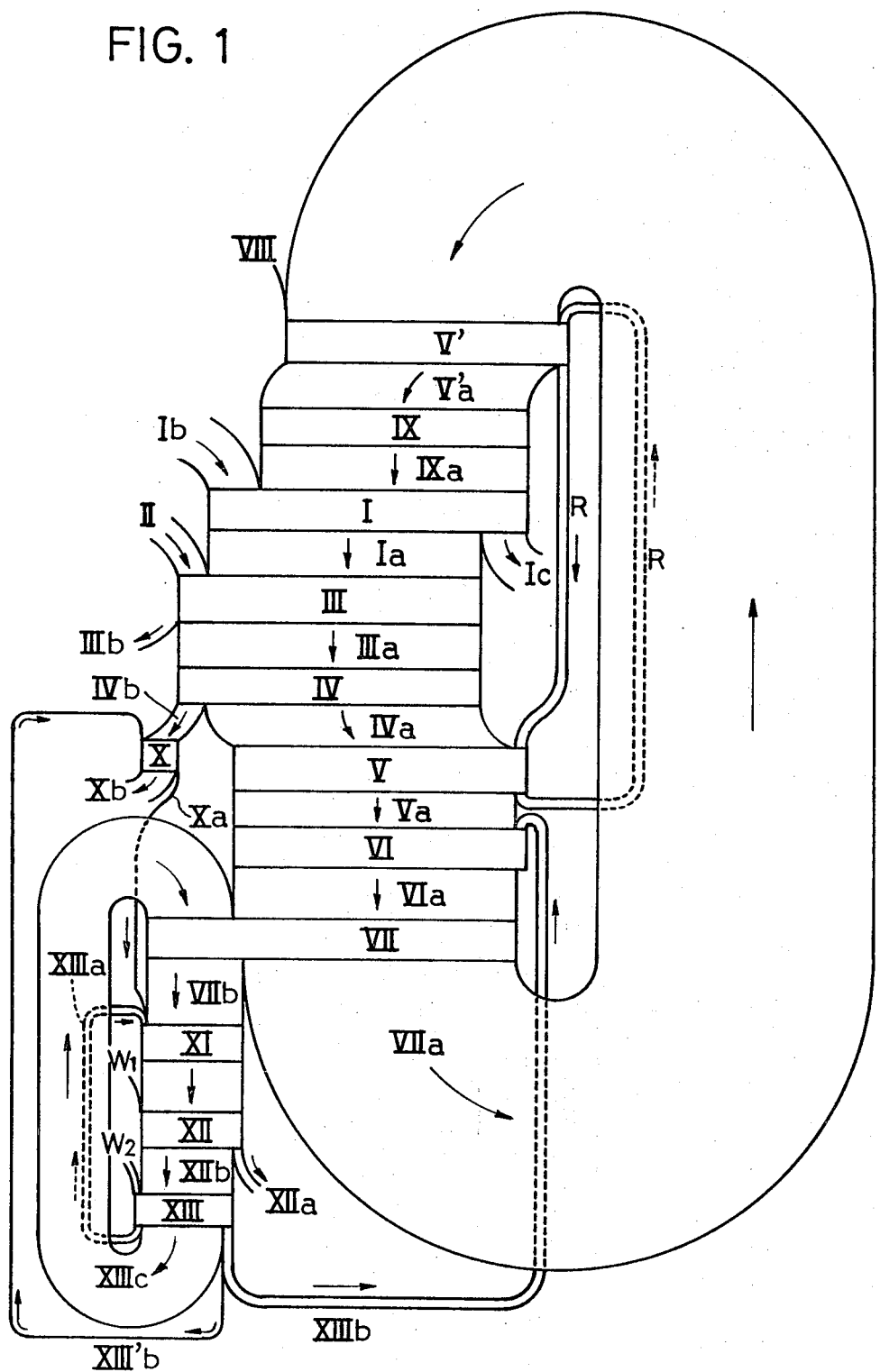

Explaining the process according to the invention more particularly in connection with the preferred embodiments thereof, firstly, a culture medium consisting of sugar source, nitrogen source and inorganic salts is sterilized through a routine manner, inoculated with mold strain capable of producing itaconic acid, e.g., Aspergillus terreus, and the strain is cultured under an aerobic condition. In the batch fermentation, it has customarily been needed to prolong the fermentation period in order to reduce the concentration of remaining sugar in the cultured broth to a value below 0.5 %. In the present process, the remaining sugar in the cultured broth does not prevent isolation of itaconic acid, and further it can be recycled and reutilized as raw material in the next fermentation medium, so that such a disadvantage of prolongation of fermentation period as described above may readily be removed. The remaining sugar may amount to a level above 1 % in the present process.

In the continuous and stationary fermentation, the lower the concentration of itaconic acid in the culturing broth is selected, the more the accumulating rate of itaconic acid therein increases as described before, however, considering the efficiency of the recovering step of the itaconic acid after the fermentation step in the present process, it has been found that the most favorable concentration of itaconic acid of the culturing broth in the continuous fermentation is approximately 3.5 %.

Itaconic acid is commonly accumulated as free acid in the cultured broth, however, when the dialyzate, which has been recovered in the electrodialysis of the present process and contains some quantities of itaconic acid and/or salt thereof, is recycled to form the raw material of the next fermentation medium, such acid and/or salt are not changed or consumed throughout the next fermentation course and remain in the next cultured broth, as they are.

In the present process, secondarily, the mycelium is removed from the cultured broth, and furthermore high molecular impurities consisting mainly of organic nitrogen compounds are removed through, e.g., ultrafiltration or isolation by reverse osmosis. This pretreatment has been found to be necessary by reason that the above impurities step up the meshes of dialytic membranes and increase the electric power consumption in the later electrodialysis, thereby the long time continuous operation of the electrodialysis becomes impossible. Some quantities of itaconic acid or the same acid together with alkali metal salt thereof still remain in the retentate ( remaining liquor ) which has been produced through the above ultrafiltration step and the like, so that, after being refined through the ion-exchange resin-process or the lead carbonate-process, such retentate are incorporated with the concentrated recovered from the concentrating compartment of the electrodialyzer and offered to the crystallization-isolation step of itaconic acid or itaconate. In the refinement of itaconic acid according to the ion-exchange resin-process in the above, the retentate is contacted with an anion-exchange resin of basic form to cause the itaconic acid to be absorbed on the resin, and after being washed, the acid is eluted with concentrated solution of alkali metal bicarbonate so as to give refined itaconate solution, whereby the resin is simultaneously regenerated and recycled to the initial contacting step with the retentate. However, the quantities of itaconic acid and its salt contained in the retentate are substantially little so that the above refining steps through the anion-exchange resin-process or the lead carbonate-process adopted in the above do not result in significant disadvantage in the present process as a whole. In the ultrafiltration, e.g., membranes having the trade marks DIAFLO UM-2, Diaflo UM-10 and the like are employed. These membranes have respectively, e.g., capacity of removing substances with molecular weights above 1,000 or above 10,000 through filtration.

In the present process, the filtrate of said ultrafiltration or the like, is then contacted with cation-exchange resin of alkali metal salt form which has been produced through the dealkalization step of the dialyzate recovered in the later electrodialysis so as to regenerate the resin to acid form. However, in the cation-exchanged liquor thus obtained, only minor portion of itaconic acid contained therein ( equal to the quantities of itaconic acid contained in the dialyzate ) is changed to alkali metal salt through the above cation-exchange step, so that the liquor is further neutralized with alkalimetal bicarbonate to PH 7.

Figure 4:
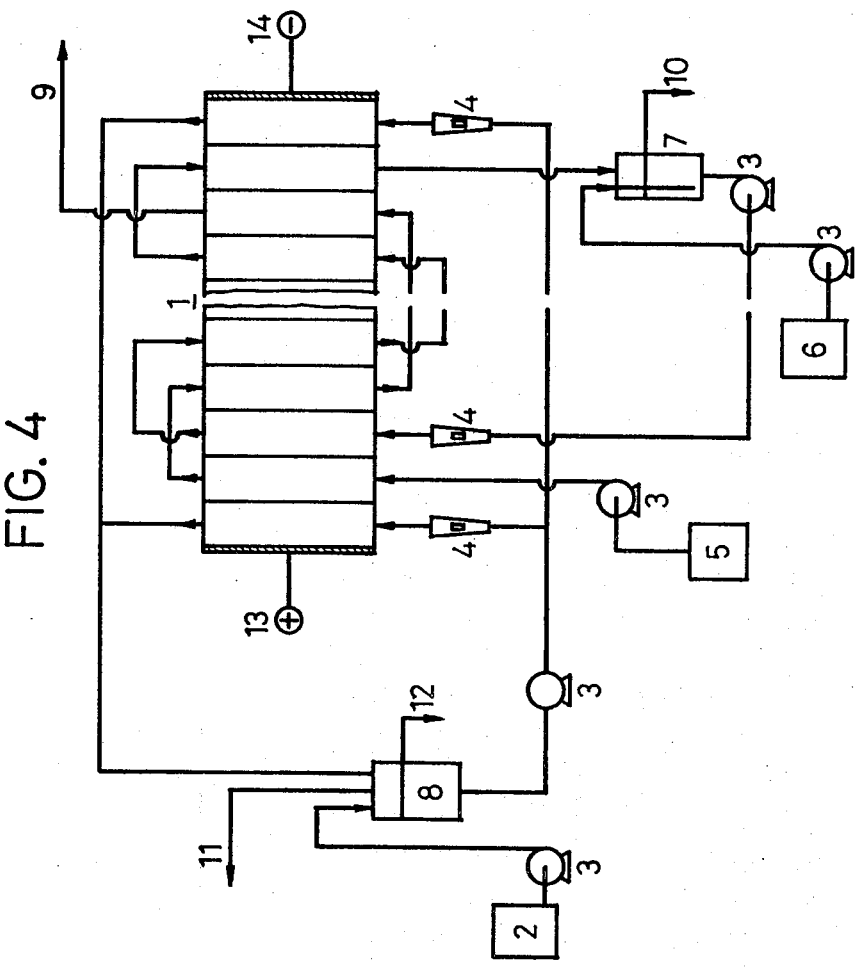
FIG. 4 is a diagrammatic explanatory drawing of an example of continuous electrodialysis unit of mult-cells type employed in the embodiments of the invention.

The neutralized liquor is then fed into the diluting compartment of the electrodialyzer of multi-cells type, wherein a number of anion- and cation-exchange resin membranes are alternately arranged between anode- and cathode compartments, and, an aqueous solution of alkali metal salt of strong acid ( e.g., potassium chloride, sodium sulfate and the like ) and/or alkali metal salt of itaconic acid is fed into the concentrating compartment of the electrodialyzer, so as to electrodialyze the itaconate contained in the above neutralized liquor. Generally, the electrodialysis may be carried out in batchwise or continuously, however, the latter is of course preferable for industrial operation. FIG. 4 is a diagrammatic explanatory drawing of an example of the continuous electrodialysis unit of multi-cells, wherein 1 shows the electrodialyzer, 2 shows the reservoir for the electrode liquor, 3,3. . . show transfer pumps, 4,4. . . show flow meters, 5 shows the reservoir for the liquor to be continuously fed into the concentrating compartment, 6 shows the reservoir for the liquor to be continuously fed into the diluting compartment, 7 shows the reservoir for the dialyzate, 8 shows the reservoir for the effluent electrode liquor, 9 shows the effluent concentrate, 10 shows the effluent dialyzate, 11 shows the electrolyzed products of the electrode liquor, 12 shows the effluent electrode liquor, 13 shows anode and 14 shows cathode.

In case that an aqueous solution of alkali metal salt of strong acid or an aqueous solution of mixture of the alkali metal salt of strong acid and and alkali metal salt of itaconic acid are continuously fed into the concentrating compartment of the electrodialyzer ( cf. FIG. 4 ), the concentrate which contains alkali metal salt of itaconic acid and alkali metal salt of strong acid, continuously flows out of the concentrating compartment. In case that a solution of only alkali metal salt of itaconic acid is continuously fed into the concentrating compartment, the concentrate containing only the itaconate alone flows out of the same compartment. In both cases the dialyzate which contains alkali metal salt of itaconic acid and some quantities of sugar, continuously flows out of the diluting compartment.

Thus obtained dialyzate contains at least 0.4 % in calculated quantity as free itaconic acid, and it is then contacted with cation-exchange resin of acid form, the quantity of which is about equivalent to that of alkali metal contained in the dialyzate, to remove the excess alkali metal ions in the dialyzate and to make the quantity thereof suitable for the material of next fermentation medium. Cation-exchange resin of alkali metal form thus produced through this step is regenerated, as described before, through the contact with the filtrate derived from the aforementioned ultrafiltration or the like.

As stated in the above, the dialyzate flowed out of the electrodialyzer in the present process is recycled to raw material of the next fermentation medium, and the itaconic acid and/or salt thereof having been contained in the dialyzate are transferred into the next fermented broth, without being changed and/or consumed throughout the next fermentation course, while the sugar having been contained in the dialyzate neutilized and fermented in usual yield by the mold in the next fermentation course. Thus, an almost closed process sytem for production of itaconic acid can be constructed in the present process, and the yield of itaconic acid at the sum total markedly increases thereby.

The concentrate flowed out of the concentrating compartment of the electrodialyzer contains about 20 % in calculated quantity as free itaconic acid at most. The above concentrate is further concentrated if necessary, thereafter a strong acid is added to this concentrated liquor so as to free all the itaconic acid contained therein, and the liquor is allowed to stand at cooled temperature, thereby itaconic acid can readily be crystallized. The mother liquor, wherefrom the crystals have been isolated, is subjected to electrolysis and thereby strong acid and hydroxide of alkali metal are respectively collected at corresponding electrodes, which can be recycled to the intermediate steps of the present process. The liquor which has been electrolyzed and has flowed out of the electrolyzer, still contains some quantities of itaconic acid, itaconic acid salt and alkali metal salts, so that it can be recycled to the concentrating compartment of the electrodialyzer. The free itaconic acid contained in the above electrolyzed liquor originates in the same remained in the preceding mother liquor wherefrom the crystals of itaconic acid have once been isolated. However, this free acid comes out as being contained in the concentrate in the next electrodialysis.

In case that a solution of only itaconate of alkali metal is fed into the concentrating compartment in the electrodialyzer, the concentrate having flowed out also contains only the itaconate, which can readily be crystallized through evaporation and the resulting mother liquor thereby can be recycled, as it is, to the concentrating compartment of the electrodialyzer.

Further, explaining the Sankey diagram of FIG. 1, aeration inlet Ib and exhaust outlet Ic are arranged in the fermentor or fermentation step I ( these Roman numerals designate the corresponding positions in the drawings ), and the fermented broth Ia come out of the fermentation I is mixed with molasses II which serves to some extent as a neutralizing material for the broth Ia, and the resulting mixed liquor is subjected to filtration III so as to remove mycelium IIIb. The filtrate IIIa is further subjected to ultrafiltration IV through which the filtrate IVa and the retentate ( remaining liquor ) IVb are derived. The filtrate IVa is contacted with cation-exchange resin of alkali metal salt form V so as to regenerate said resin V. The cation-exchange liquor Va is further perfectly neutralized VI, and the neutralized liquor VIa is fed into the diluting compartment of the electrodialyzer VII, while a solution of potassium chloride being fed into the concentrating compartment of the same. The dialyzate VIIa flowed out of the diluting compartment of the electrodialyzer VII is contacted with cation-exchange resin of acid form V' which has been regenerated in the previous cation-exchange step V ( R with arrow represents recycle of the resin ). After addition of other nutrient sources VIII, the cation-exchanged liquor V'a is sterilized IX and used for the next fermentation medium.

The retentate IVb come out from the ultrafiltration IV is treated with anion-exchange process X, and the liquor Xa eluted from the resin is mixed with the concentrate VIIb flowed out of the concentrating compartment of electrodialyzer VII. To the resulting mixed liquor, is added hydrochloric acid XIIIa so as to free the itaconic acid contained in said liquor, and the acidified liquor is left to stand at low temperature so as to crystallize out XI itaconic acid. The resulting slurry is centrifuged XII to give crystals of itaconic acid XIIa, and the mother liquor XIIb is, after being incorporated with washing water $W_1$ and further diluting water $W_2$, electrolyzed XIII. Solution of potassium hydroxide XIIIb formed at the cathode of the electrolyzer XIII is recycled to the aforementioned neutralizing step VI, while a portion XIII'a of the same solution is recycled to the anion-exchange process X. Hydrochloric acid XIIIa formed at the anode is recycled to the above-mentioned dealkalization step. The liquor XIIIc which has been electrolyzed is recycled to the concentrating compartment of the electrodialyzer VII.

In the embodiment of FIG. 1, the molasses II is utilized as a portion of neutralizing material for the fermented broth Ia, because a considerable quantity of potassium is contained in molasses ( cf. Principles of Sugar Technology, III, p. 676, Elsevier Publishing Co., Amsterdam-London-N.Y. (1963) ). That is, the embodiment is an advantageous process system combining effectively the extraction of potassium from the molasses with the isolation of itaconic acid from the fermented broth. In this process, it has been disclosed that a large quantity of sugar, which has come out of the molasses, does not prevent the isolation of itaconic acid from the fermented broth at all.

Figure 2:
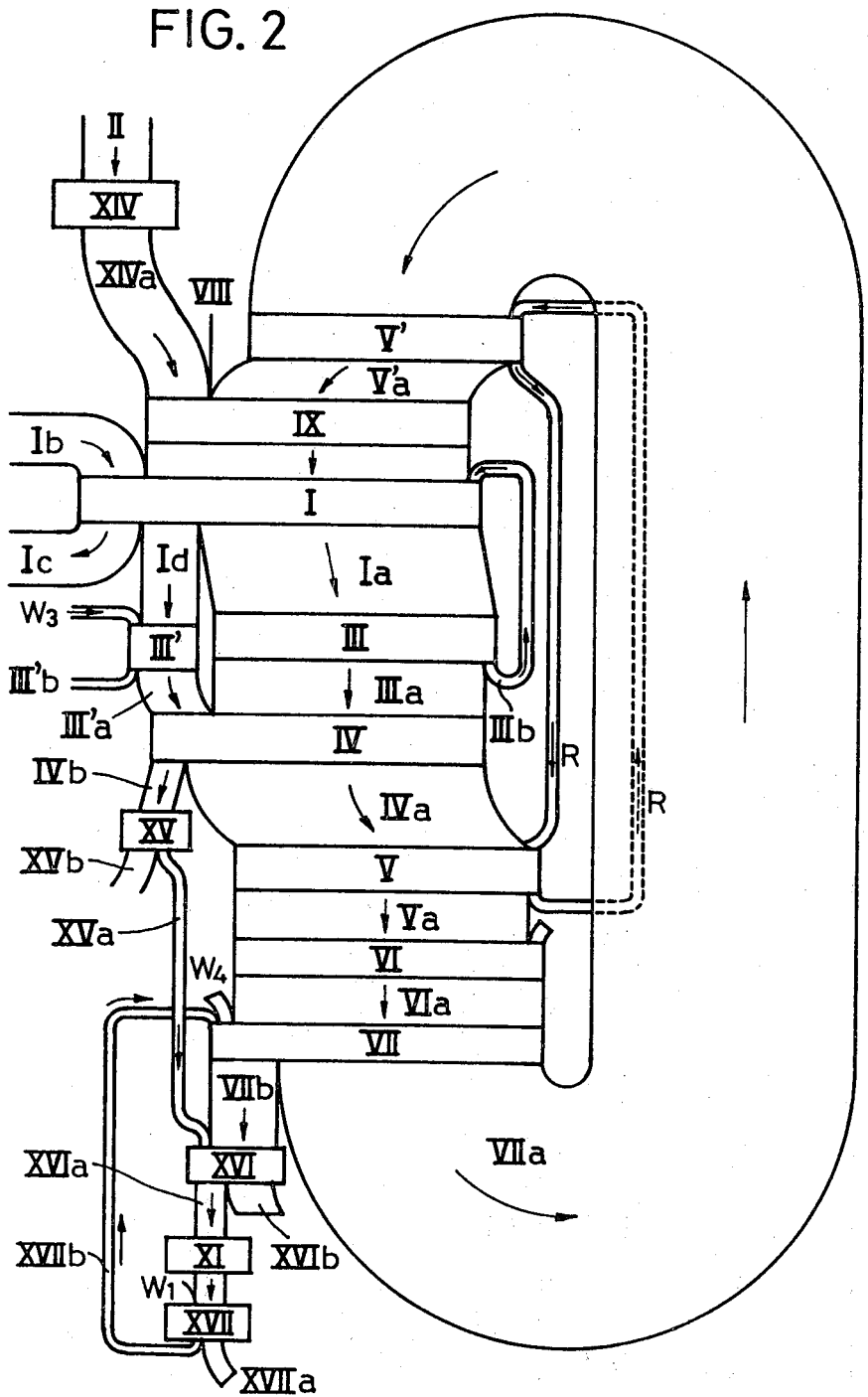
FIG. 2 is also a Sankey diagram of another embodiment in case of adopting continuous stationary itaconic acid fermentation in the present invention.
Figure 3:
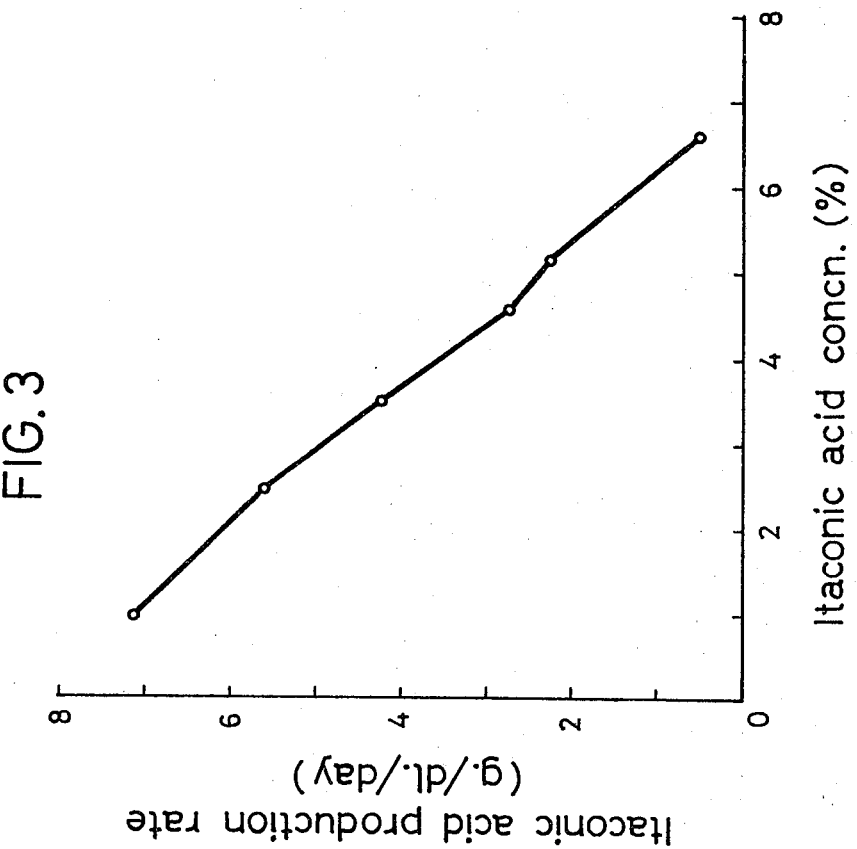
FIG. 3 is a graph, wherein is expressed the accumulating rates of itaconic acid in the culturing broth per day ( g./dl of broth/day ) in case that various stationary levels values of itaconic acid concentration in the culturing broth are adopted in the continuous stationary itaconic acid fermentation.

In the FIG. 2, the fermentation step I is performed through continuous stationary fermentation, and the meaning of each designation is the same as that in FIG. 1 except undermentioned points. Referring now to items different from FIG. 1, firstly, the sugar material II is not added to the fermented broth Ia, but pretreated with cation-exchange resin of acid type XIV, and the cation-exchanged liquor XIVa is incorporated with the liquor V'a derived from the dialyzate VIIa. Secondarily, a portion Id of the fermented broth is separately filtered III', and the filtrate III'a is incorporated with the filtrate IIIa, however, the mycelium III'b separated through filtration III' is discarded while the mycelium IIIb separated being recycled into the fermentor I ( $W_3$ shows washing water ). Through these operations, the propagated increased portion of mycelium in the fermentation course is discharged therefrom and the mycelium concentration in the culturing broth maintained on a stationary level.

The third different point is, that the retentate IVb come out through the ultrafiltration IV is subjected to the lead carbonate process XV so as to refine itaconic acid XVa contained therein, while the lead salt XVb being recovered and recycled. Further, the fourth different point is as follows: an aqueous solution of alkali metal salt of itaconic acid is fed into the concentrating compartment of electrodialyzer VII, and the concentrate VIIb consisting of the itaconic acid salt alone is recovered from the same compartment. The concentrate VIIb is, after being incorporated with the refined liquor XVa of the retentate IVb, concentrated XVI under a reduced pressure, and the resulting concentrated liquor XVIa is allowed to stand at a low temperature ( XVIb represents evaporated water ) so as to crystallize XI potassium itaconate. The resulting slurry is centrifuged XVII to obtain potassium itaconate XVIIa, and the mother liquor XVIIb containing potassium itaconate is recycled, as it is, to the concentrating compartment of the electrodialyzer VII ( $W_4$ represents diluting water ).

The following examples serve to illustrate the invention without however limiting it:

EXAMPLE 1

Aspergillus terreus K26 ( ATCC No. 10020 ) capable of producing itaconic acid is cultured in a high test molasses medium in a routine manner, and the resultant fermented broth is filtered to give 2,727.8 g. of filtrate containing 99.2 g. in calculated quantity as free itaconic acid ( this underlined representation shall be shortened to "g. in calc. itaconic acid" hereinafter ) and 36.5 g. of remaining sugar. To the above filtrate of the fermented broth, are added 258.2 g. of high-test molasses containing 176.9 g. of sugar, and the resulting mixture is subjected to ultrafiltration for 6.4 hours under a pressure of 4 kg./cm$^2$ using filter membrane ( with trade mark DIAFLO UM-10 ), whereby 2,292.4 g. of filtrate containing 74.9 g. in calc. itaconic acid and 144.4 g. of sugar as well as 693.6 g. of retentate containing 24.3 g. in calc. itaconic acid and 69.0 g. of sugar are obtained.

2,230.9 g. of said filtrate ( containing 72.9 g. in calc. itaconic acid and 140.5 g. of sugar ) are caused to flow through a column of cation-exchange resin of potassium salt form ( with trade mark "Amberlite XE232" ), which has been produced through the later step of the present example, at a space velocity below 1, thereby the resin is regenerated to acid form and 2,166.9 g. of cation-exchange liquor containing 72.1 g. in calc. itaconic acid and 138.6 g. of sugar are obtained. 345.0 g. of water are caused to flow through the resin column and 360.9 g. of washing containing 0.8 g. in calc. itaconic acid and 1.9 g. of sugar flow out. 119.7 g. of potassium bicarbonate are added to the cation-exchanged liquor so as to adjust PH thereof to 7, thereby 2,237.8 g. of neutralized liquor containing 114.1 g. of potassium itaconate and 138.6 g. of sugar are obtained.

The above neutralized liquor is placed into the diluting compartments of an electrodialyzer, which is so composed that eleven sheets of cation-exchange membrane ( with trade mark SELEMION CMV ) and ten sheets of anion-exchange membrane ( with trade mark SELEMION AMV ), each dialysis area of these membranes being constructed as to be 6 × 6 cm², are alternately arranged in parallel and at a distance of about 10 mm from each other, between two electrode compartments, and 2,150.2 g. of aqueous solution containing 42.8 g. of potassium chloride are placed into the concentrating compartments of the same, so as to electrodialyze potassium itaconate contained into the neutralized liquor. The liquor placed in the diluting compartments and the solution placed into the concentrating compartments are both circulated in routine manner in the respective compartments. As the result, 2,005.0 g. of the dialyzate containing 28.2 g. of potassium itaconate and 129.2 g. of sugar as well as 2,428.4 g. of the concentrate containing 81.8 g. of potassium itaconate and 42.1 g. of potassium chloride are respectively recovered from the diluting- and concentrating-compartments. Starting electric currented of 770 mA and tension of 25 V have become respectively 205 mA and 61 V at the end of the dialysis. Thereafter, the diluting compartments are washed with 1,265.0 g. of water, thereby 1,546.2 g. of washing liquor containing 2.1 g. of potassium itaconic acid 9.4 g. of sugar flow cut, while the concentrating compartments are washed with 1,202.0 g. of water, thereby 923.3 g. of washing liquor containing 1.3 g. of potassium itacontate and 0.7 g. of potassium chloride flow out.

To 2,005.0 g. of the above-mentioned dialyzate (containing 28.2 g. of potassium itaconate and 129.2 g. of sugar ), are added 160 ml of cation-exchange resin of acid form ( with trade mark "Amberlite XE232" ), which has been regenerated through the aforementioned step in the present example and the quantity of which is about equivalent to that of potassium itaconate contained in the dialyzate, and the resulting mixture is agitated periodically for an hour, whereafter the resin is separated through filtration and further washed with 3,570 g. of water. The filtrate is incorporated with washing and concentrated at the temperature of 50° C to give 2,005.0 g. of concentrated liquor ( containing 16.0 g. of free itaconic acid, 2.86 g. of potassium itaconate and 129.2 g. of sugar ). To the above mother liquor are added 5.71 g. of ammonium nitrate, 1.96 g. of magnesium sulfate, 1.96 g. of corn steep liquor and 0.14 g. of concentrated nitric acid, so as to prepare 2,014.8 g. of culture medium with PH 2.5. This medium is placed 118 ml by 118 ml into seventeen 500ml-flasks and sterilized at 120° C for 7 minutes. After 4.00 g. of sterilized aqueous solution containing 0.12 g. of surface-active agent ( with trade mark "Emulgen 910" ) being added to each flask, the medium in each flask is inoculated with 6.11 g. of seed of Aspergillus terreus K26, which has previously been prepared through cultivation and contains about 0.08 g. of itaconic acid and about 0.29 g. of sugar. The inoculated mold is cultured at 36° C on a reciprocating shaker, for 4 days. As the result, 1,942.0 g. of fermented liquor containing 75.15 g. of itaconic acid, 2.86 g. of potassium itaconic, 24.33 g. of sugar and 12.13 g. of mycelium are obtained in totalizing the seventeen flasks. The yield of itaconic acid to the consumed sugar amounts to 55.6 % and no reduction in the yield appears.

On the other hand, 693.6 g. of the retentate come out through the ultrafiltration are caused to flow through a column of anion-exchange resin of weak basic form ( with trade mark "Amberlite IRA93" ) at a space velocity below 1, so as to cause itaconic acid to be absorbed on the resin, and after being washed with water, the resin is subjected to elution with concentrated solution of potassium bicarbonate to give 198.2 g. of eluate containing 34.5 g. of potassium itacontate. The eluate is incorporated with 2,428.4 g. of the concentrate having been recovered in the electrodialysis and containing 81.8 g. of potassium itaconate together with 42.1 g. of potassium chloride, and concentrated in vacuo at the temperature of 50° C to 437.3 g. in amount. 118.5 g. of hydrochloric acid having concentration of 11.35 N are added to the resulting concentrated liquor, and after being left to stand at the temperature of 10° C overnight so as to crystallize itaconic acid, the crystals are centrifuged. The yield amounts to 53.8 g. which corresponds to 73.2 % of the calculated quantity as free itaconic acid in the solution. 502.0 g. of the resulting mother liquor containing 19.7 g. of itaconic acid and 126.1 g. of potassium chloride are subjected to electrolysis using diaphragm type electrolyzer, thereby potassium ions in the liquor are recovered as potassium hydroxide at the cathode and chlorine ions are recovered as chlorine gas at the anode. The potassium hydroxide is converted to potassium bicarbonate through contacting with carbonic acid gas, and the potassium bicarbonate is used for the abovementioned neutrallization step of the cation-exchanged liquor. The chlorine gas is changed into hydrochloric acid by causing it to react on hydrogen having formed at the cathode, and the resulting hydrochloric acid is used for the removal of potassium from the concentrated recovered in the electrodialysis. 398.3 g. of the liquor which have been electrolyzed and contain 19.7 g. in calc. itaconic acid and 42.8 g. of potassium chloride, are, after addition of 1,751.9 g. of water, recycled to the concentrating compartments of said electrodialysis.

EXAMPLE 2

A leaf-type filter through which fermented broth except mycelium can be filtered and discharged out of the fermentor, is arranged inside a 20L-jar fermentor. 8 L of culture medium composed of 7 % of raw cane sugar, 0.3 % of ammonium nitrate, 0.1 % of magnesium sulfate, 0.02 % of sodium secondary phosphate and 0.0004 % of copper sulfate are placed in the fermentor, and the medium is inoculated with about 400 ml of seed prepared in such a way as Aspergillus terreus K26 is shake-cultured in a medium having the same composition as the above at 30° C for 2 days, and thereupon batchwise cultivation of the mold is carried out at the temperature of 35° C, under conditions of an aerating rate of 0.8 L/minute and an agitating rate of 460 r.p.m. After about 40 hours, a fresh medium composed of 6.3 % of raw cane sugar, 0.25 % of ammonium nitrate, 0.1 % of magnesium sulfate, 0.06 % of sodium secondary phosphate and 0.0004 % of copper sulfate is continuously fed into the fermentor at a predetermined rate, while continuously discharging the same quantity of the culturing broth in the fermentor by means of employing filtration through the leaf-type filter together with overflow of the broth through an overflowing pipe. A minor portion of the culturing broth is periodically taken out of the fermentor and subjected to estimation of the mycelium concentration in the broth, and the feeding rate of the fresh medium as well as the discharging rate of the broth through the leaf-type filter is adjusted so as the mycelium concentration to be maintained on the level of about 1.5 %. After about 48 hours from the beginning of the fresh medium feeding, the continuous and stationary state, wherein itaconic acid concentration in the culturing broth is about 2.6 %, remaining sugar concentration is about 1.3 %, mycelium concentration is about 1.5 % and PH is about 2.2, is attained, under the conditions of the culturing temperature of 35° C, aerating rate of 0.8 L/minute, agitating rate of 540 r.p.m., and fresh medium feeding rate of 500 ml/hour. Thus, the itaconic acid accumulating rate in the culturing broth amounts to 5.3 g./dl of broth/day, and yield of itaconic acid to consumed sugar amounts to about 50 %.

The discharged filtrate through the leaf-type filter set in the fermentor is incorporated with filtrate of the culturing broth discharged through the overflowing pipe of the fermentor, and the incorporated liquor is subjected to the ultrafiltration through filter membrane ( with trade mark DIAFLO-UM2 ) at a rate of 500 ml/hour, whereby filtrate and retentate, both of which contain 2.5 g./dl in calc. itaconic acid and 1.2 g./dl of sugar, are obtained respectively at rates of 450 ml/hour and 50 ml/hour. The filtrate is caused to flow through a column of cation-exchange resin of potassium salt form ( with trade mark "Amberlite XE232" ), which has been produced through the later step of the present example, so as to regenerate the resin. The cation-exchanged liquor thus obtained is nuetralized with potassium bicarbonate to PH 7.0, thereby a liquor containing 3.96 g./dl of potassium itaconate and 1.2 g./dl of sugar is formed.

The neutralized liquor is continuously fed at a rate of 450 ml/hour into the diluting compartment of the electrodializer, which is so composed that eleven cation-exchange membranes ( with trade mark SELEMION CMV ) and ten anion-exchange membranes ( with trade mark SELEMION AMV ), each dialysis area of these membranes being constructed as to be 3.4 × 3.4 cm$^2$, are alternately arranged in parallel and at a distance of about 10 mm from each other, between two electrode compartments, while a liquor containing 3.68 g./dl of pure potassium itaconate is continuously fed at a rate of 99 ml/hour into the concentrating compartment of the electrodialyzer, and an electric current with density of 240 mA/11.3 cm$^2$ ( tension of 24.6 V ) is charged therein for 1.5 hours ( cf. FIG. 4 ). As the result, the dialyzate containing 2.88 g./dl of potassium itaconate and 1.2 g./dl of sugar, continuously flows out of the diluting compartment at a rate of 450 ml/hr, while the concentrate containing 10.28g./dl of itaconate continuously flowing out of the concentrating compartment at a rate of 116 ml/hour. The above results indicate that 8.23 g./hour of potassium itaconate has been transferred from the diluting compartments to the concentrating compartments in 10 pairs of cells.

The aforementioned dialyzate flowed out of the electrodialyzer is caused to flow through a column of cation-exchange resin of acid form ( with trade mark "Amberlite XE232" ), which has been regenerated in the aforementioned step in the present example, and the quantity of which is about equivalent to the quantity of potassium itaconate contained in the dialyzate, so as to obtain acidified cation-exchange liquor. Raw cane sugar, inorganic salts and water are added to the above acidified liquor to prepare such a medium as composed of 6.1 % of sugar, 0.25 % of ammonium nitrate, 0.1 % of magnesium sulfate, 0.06 % of sodium secondary phosphate, 0.0004 % of copper sulfate, 1.10 % of itaconic acid and 0.18 % of potassium itaconate. The prepared medium is continuously recycled to the fermentor at a rate of 500 ml/hour so as to accomplish continuous fermentation. In the stationary state, the concentration of itaconic acid was about 3.2 %, that of remaining sugar was about 1.3 %, that of mycelium was about 1.5 % and PH was 2.0–2.2. The accumulating rate of itaconic acid in the culturing broth was 5.0 g./dl/day, and yield of itaconic acid to consumed sugar was about 55 %.

On the other hand, the retentate come out through the ultrafiltration step is collected, and to 250 ml of such retentate is added lead carbonate so as to precipitate lead itaconic, which is, after being filtered, decomposed with potassium bicarbonate, thereby 52 ml of refined solution containing 17.1 g./dl of potassium itaconate is obtained.

52 ml of the above refined solution are incorporated with 578.0 ml of the concentrate containing 10.28 g./dl of potassium itaconate, and concentrated in vacuo. The concentrated liquor is left at the temperature of 10° C so as to crystallize potassium itaconate, and the resulting slurry is centrifuged, thereby 50.0 g. of crystals and 29.7 g. of mother liquor containing 18.3 g. of potassium itaconate are obtained. To the mother liquor are added 473.7 g. of water and the resulting solution containing 3.7 g./dl of potassium itaconate is recycled to the concentrating compartment of the electrodialyzer.

We claim:

1. Process for the production of itaconic acid which comprises:
   a. culturing an itaconic acid producing mold in a culture broth containing a sugar source, nitrogen source, and inorganic salts under aerobic conditions;
   b. removing high molecular substances having the property to prevent electrodialysis of itaconic acid salts from said broth said;
   c. contacting the filtrate thus obtained with a cation-exchange resin of an alkali metal salt form which is subsequently regenerated through the present process to the acid form;

d. neutralizing the thus produced cation-exchanged liquor;

e. feeding the neutralized liquor into the diluting compartment of an electrodialyzer which is composed of ion-exchange membranes, while an aqueous solution of alkali metal salt of a member of the group consisting of strong acid, itaconic acid, and mixtures thereof is fed into the concentrating compartment of the same, and then electrodialyzing the itaconic acid salts contained in the neutralized liquor;

f. incorporating the concentrate recovered in the electrodialysis with the retentate from step (b) which is refined prior to incorporation with the concentrate ;

g. crystallizing and isolating itaconic acid or alkali metal salt of itaconic acid from the resulting incorporated liquor, while, contacting the dialyzate recovered in the electrodialysis with about an equivalent quantity of cation-exchange resin of acid form regenerated in step (c); and h. recycling the resulting cation-exchange liquor to form the raw material of the next fermentation medium.

2. Process as described in claim 1, where an ultrafiltration operation is used to remove said high molecular substances.

3. Process as described in claim 1, where reverse osmosis-operation is used to remove said high molecular substances.

4. Process as described in claim 1, where the sugar source is obtained by mixing molasses with the filtrate of the fermented broth.

5. Process as described in claim 1, where an aqueous solution of alkali metal salt of itaconic acid is fed into the concentrating compartment of the electrodialyzer, and the incorporated liquor described in step (f), is concentrated to crystallize and isolate the alkali metal salt of itaconic acid, and the resulting mother liquor is recycled, to the concentrating compartment of the electrodialyzer.

6. Process as described in claim 1, where the itaconic acid contained in the retentate is refined by a anion-exchange resin process.

7. Process as described in claim 1, where itaconic acid contained in the retentate is refined by a lead carbonate process.

8. Process as defined in claim 1, where the itaconic acid fermentation is performed in a continuous manner with aeration and agitation, the itaconic acid concentration in the culturing broth being maintained at a stationary level of approximately 3.5%.

9. Process as described in claim 1, where the itaconic acid fermentation is performed in a batchwise manner and the fermentation is terminated when the concentration of remaining sugar in the culturing broth is still at a level above 1%.

10. Process as defined in claim 1, where an aqueous solution of an alkali metal salt of a strong acid is fed into the concentrating compartment of the electrodialyzer, and strong acid is added to the incorporated liquor described in step (f) and then crystallizing and the free isolating itaconic acid, the resulting mother liquor is electrolyzed to give the solution of strong acid and that of alkali metal hydroxide both of which are respectively recycled to raw materials in the intermediate steps of the process, and further the said electrolyzed liquor uis recycled to the concentrating compartment of the electrolyzer.

11. Process as described in claim 10, where an aqueous solution of the mixture of the alkali metal salt of strong acid and alkali metal salt of itaconic acid is used instead of the aqueous solution of alkali metal salt of strong acid.

* * * * *